Oct. 11, 1949.　　　　J. J. SMITH　　　　2,484,755
WATER METER YOKE
Filed Sept. 22, 1947
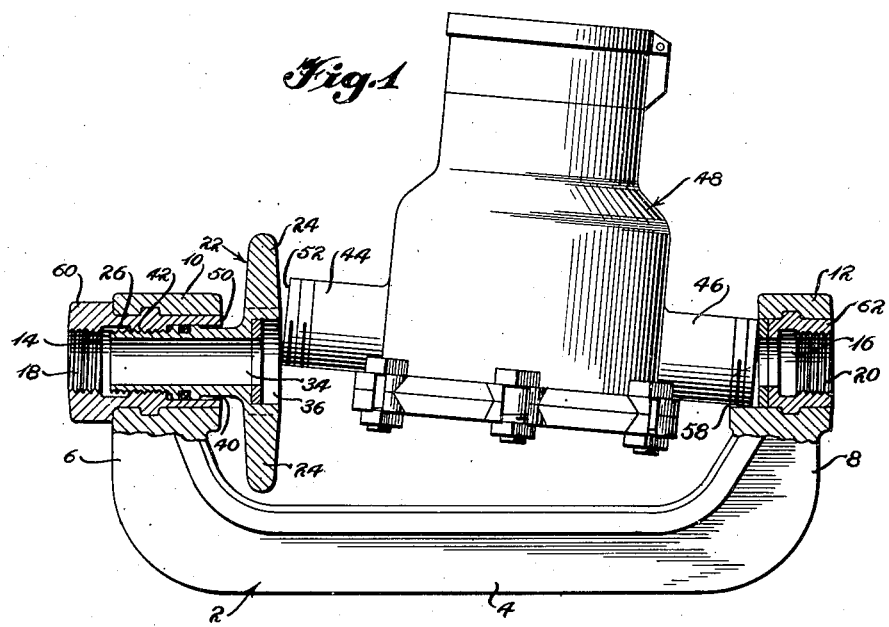
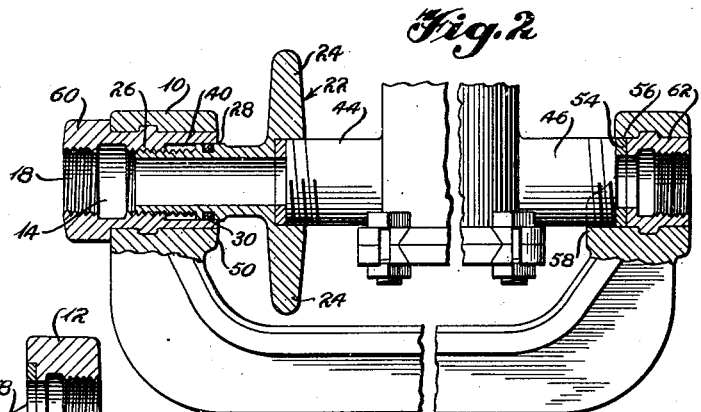
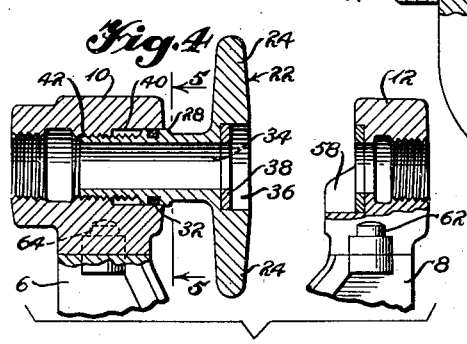
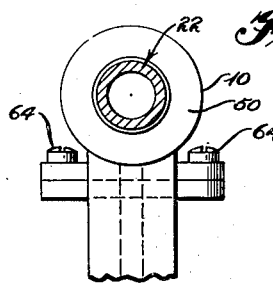
INVENTOR.
*John J. Smith*
BY
*Cushman, Darby & Cushman*
*Attorneys*

Patented Oct. 11, 1949

2,484,755

UNITED STATES PATENT OFFICE 2,484,755

WATER METER YOKE

John J. Smith, Decatur, Ill., assignor to Mueller Co., Decatur, Ill., a corporation of Illinois Application September 22, 1947, Serial No. 775,438

7 Claims. (Cl. 285—3)

This invention relates to meter supporting devices and is particularly concerned with water meter yokes of the type in which the spuds of the water meter are coupled between the upturned ends of the yoke, which are connected to service pipes or risers, by means of a threaded spindle which forces the meter into coupling position.

A principal object of this invention is the provision of water meter supports of the indicated type in which there are no externally exposed threaded portions of the device, thus preventing accumulation of dust and corrosion upon threaded portions of the meter support and eliminating the inability to properly release or connect a meter because of immobilized threaded units.

Another object is the provision of a new type of meter supports so designed that the removal of the operating or clamping spindle from the device leaves the unit in such condition that unauthorized persons are unable to couple short sections of pipe or the like between the ends of the meter yoke so as to obtain unmetered water through the disconnected line.

A further object is the provision of a meter support of the indicated type in which there is maintained a fluid-tight connection between the meter-clamping spindle and supporting yoke regardless of the position of the spindle within the yoke.

Other objects and the entire scope of applicability of the present invention will become apparent from the detailed description given hereinafter in connection with the attached drawing, in which:

Figure 1 is a side elevation partly in section of one form of my meter support showing a meter being installed therein;

Figure 2 is a side sectional view of the structure shown in Figure 1, with the meter clamped in the meter yoke;

Figures 3 and 4 are sectional side views of a modified form of my device;

Figure 5 is a sectional view on the line 5—5 of Figure 4.

Referring in detail to the drawings, the meter supports of this invention may assume various forms, but essentially they comprise a yoke 2 having a base portion 4 and two upturned ends 6 and 8. The upturned ends 6 and 8 are provided with enlarged cylindrical sections or bosses 10 and 12 having central openings or bores 14 and 16 therethrough. The two outside ends of these boss openings are provided with inside threaded sections 18 and 20 which are adapted to receive the threaded ends of service pipes or risers, not shown.

Another essential element of my device is a spindle 22 having radial handles 24 at one end and an outside threaded section 26 at the opposite end. Between the two ends of the spindle, and preferably immediately adjacent to the threaded section 26, there is provided an annular, raised shoulder 28 which has a recess 30 adapted to receive packing material, such as an O-ring 32. The spindle 22 is also provided with a tubular opening or hole 34, extending clear through the spindle. This is surrounded at one end by a circular recessed portion 36 having its central axis in line with the axis of the tubular opening 34. A sealing washer or other packing material 38 rests upon the base of this recessed portion 36. The opening 40 in the inner end of the yoke 10 is of such size that the shoulder 28 of the spindle 22 fits very closely within the opening and forms a seal upon the spindle in cooperation with the packing 32 carried in the recess 30 of the spindle shoulder 28.

The boss 10 is provided with a centrally located inside threaded section 42 which is adapted to receive the threaded portion 26 of the spindle. Thus, it can be seen by comparison of Figures 1 and 2 that by screw-threading the spindle 22 into the boss 10, sufficient space is created between the two bosses 10 and 12 to permit the spuds 44 and 46 of the meter 48 to enter the yoke. Then, when the spindle 22 is screw-threaded out of the boss 10, the spuds of the meter are clamped into position and it is operatively coupled. It will be further apparent from Figure 2 that the length of the opening 40 is sufficient so that the spindle may be moved through the distance necessary to retract the spindle to disengage or extend the spindle to engage a meter without having the recess 30 of the shoulder 28 protrude beyond the inner edge 50 of the boss 10.

When the meter is in an installed position, the spud 44 is embraced by the recess 36 with the outside edge 52 of the spud forced against the packing washer 38 and the spud 46 is forced against the packing washer 54 which is carried in a circular recess 56 in the boss 12. The meter is further supported at the lower portion of the spud 46 upon a dished extension 58 protruding from the boss 12.

The bosses of my meter supports may take various forms. As illustrated in Figures 1 and 2, the bosses comprise enlarged, tubular sections into which there is molded bushings 60 and 62 which carry the threaded portions and tubular openings referred to above. On the other hand, where it is desirable to cast the entire yoke including bosses in an integral piece, my meter supports will take the form illustrated in Figure 3. In this latter form, if the yoke is cast of iron or steel, the threads are preferably plated with cadmium or other non-rust material.

Alternatively, the bosses 10 and 12 may be formed completely independently of the yoke 2 and fastened to the upturned ends 6 and 8 of the yoke by means of suitable fastening devices, such as the machine screws 64, as is illustrated in Figures 4 and 5.

When a meter is disconnected by retraction of the spindle 22, as shown in Figure 1, and is completely removed, the entire spindle structure 22 may be removed from the installed water meter yoke by unthreading the spindle from the boss 10. This prevents the unauthorized use of water through the coupled water service line since it is not possible to install short sections of pipe or similar devices between the bosses of the meter support, as is the case with many types of meter supports used heretofore. Furthermore, it will be observed that the only time at which any of the threaded sections of the meter support become exposed is at the time the spindle is removed as indicated with the result that corrosion or accumulation of dirt upon threaded portions is prevented, eliminating difficulties with removal of installation of meters because of inoperability of moving parts, as is the case in meter yokes in which there are externally exposed threaded sections. Thus, the packing about the spindle serves not only to prevent fluid leakage, but also excludes dust or corrosive materials from contact with the spindle threads.

I claim:

1. A device for supporting and coupling a meter in a service line which comprises a yoke, tubular openings in the upturned ends of the yoke, a spindle having a tubular opening therethrough with radial arms at one end and an outside threaded section at the opposite end, an annular shoulder centrally located upon the outside of the spindle having a recess therein adapted to receive packing, said shoulder being of such size as to closely fit in one of said yoke openings and an inside threaded section in this opening located centrally in the opening a sufficient distance from the inner end of the opening so that the spindle shoulder packing recess does not extend beyond the inner edge of said yoke opening when the spindle is extended from the yoke a sufficient distance to couple a meter.

2. A water meter support comprising a yoke, a boss on each end of the yoke having an opening therethrough, a centrally bored spindle, an outside threaded section on the end of the spindle, an annular recess on the spindle adapted to receive packing material, the opening in the inner end of one boss being circularly sized to admit the threaded section and to slidably embrace the recessed section of the spindle, an inside threaded section centrally located in this boss into which said spindle may be screw-threaded, the opening in this boss extending from said central threaded section to the inner boss end edge a sufficient length that said recessed portion of the spindle remains within the boss opening when a meter is installed in the meter support.

3. A water meter support comprising a yoke, a boss on each end of the yoke having an opening therethrough, a centrally bored spindle with exterior threads on one end and radial handles on the opposite end, an annular shoulder upon the spindle between the handle and said threads, the opening on the inner end of one of said bosses being sized to slidably receive said spindle shoulder, an inside threaded section centrally located in this boss into which said threaded portion of the spindle may be screw-threaded, said inner end boss opening being of such length that the spindle may be threaded within the boss to connect or disconnect a meter within the support without exposing the threads of said spindle beyond the end of the spindle bearing boss and packing means sealing the spindle within said boss opening.

4. A meter support in accordance with claim 3, in which said bosses are cast integral with the yoke.

5. A meter support in accordance with claim 3, in which said bosses are fastened to a separately cast yoke.

6. A meter support in accordance with claim 3, in which the bosses having interior bushings molded therein which form the recited boss openings and carry the recited threaded sections.

7. A water meter support comprising a yoke, a boss on one upturned end of the yoke provided with a tubular opening therethrough having an inside threaded section on the outer end and a concentric sealing washer seat on the inner end, a dished extension on the inner side of the boss adapted to support a meter spud, a second boss at the other upturned end of the yoke having a tubular opening therethrough with an inside threaded section on its outer end and a centrally located, inside threaded section separate from the outer end threaded section, a spindle having a bore therethrough with radial handles at one end and an outside threaded section at the other end, an annular raised section on the outside of the spindle adjacent said outside threaded section adapted to receive packing, a circular recess in the handle end of the spindle concentric with the central axis of said spindle bore adapted to receive a sealing washer and a meter spud, the opening on the inner end of said second named boss being adapted to slidably receive said spindle raised section and being of sufficient length that said spindle raised section will remain within this boss opening whether the spindle is retracted to release a meter or is extended to couple a meter.

JOHN J. SMITH.

REFERENCES CITED

The following references are of record in the file of this patent:

UNITED STATES PATENTS

| Number | Name | Date |
|---|---|---|
| 1,039,575 | Mueller | Sept. 24, 1912 |
| 1,495,011 | Ford | May 20, 1924 |